(12) United States Patent
McLeod et al.

(10) Patent No.: US 10,780,715 B1
(45) Date of Patent: Sep. 22, 2020

(54) SEMI-AUTOMATIC GARMENT IDENTIFIER AND HANGER LABELING SYSTEM

(71) Applicant: Garment Management Systems, LLC, Little Rock, AR (US)

(72) Inventors: Brett McLeod, Little Rock, AR (US); Ed Hill, Little Rock, AR (US)

(73) Assignee: Garment Management Systems, LLC, Little Rock, AR (US)

( * ) Notice: Subject to any disclaimer, the term of this patent is extended or adjusted under 35 U.S.C. 154(b) by 196 days.

(21) Appl. No.: 16/041,459

(22) Filed: Jul. 20, 2018

Related U.S. Application Data

(60) Provisional application No. 62/534,740, filed on Jul. 20, 2017.

(51) Int. Cl.
*B41J 3/407* (2006.01)
*A47G 25/14* (2006.01)
*G06Q 20/20* (2012.01)
*G06Q 30/04* (2012.01)

(52) U.S. Cl.
CPC ........ *B41J 3/4075* (2013.01); *A47G 25/1428* (2013.01); *G06Q 20/202* (2013.01); *G06Q 20/209* (2013.01); *G06Q 30/04* (2013.01)

(58) Field of Classification Search
CPC . B41J 3/4075; A47G 25/1428; G06Q 20/202; G06Q 20/209; G06Q 30/04
See application file for complete search history.

(56) References Cited

U.S. PATENT DOCUMENTS

| | | | | |
|---|---|---|---|---|
| 2,543,323 A | * | 2/1951 | Marsh | G03C 5/30 156/355 |
| 5,374,130 A | * | 12/1994 | Hirono | B41J 3/4075 101/288 |
| 5,782,496 A | * | 7/1998 | Casper | G09F 3/10 283/101 |
| 2007/0261997 A1 | * | 11/2007 | Cassady | B07C 5/3412 209/3.3 |
| 2010/0146805 A1 | * | 6/2010 | Kim | F26B 11/12 34/201 |
| 2013/0245174 A1 | * | 9/2013 | Kian | C09J 133/08 524/293 |

* cited by examiner

*Primary Examiner* — Paul Danneman

(57) ABSTRACT

A semi-automatic garment identifier and hanger labeling system utilizes a label printer with a hanger guide to facilitate quick and error-free placement of an adhesive tag onto the hanger. The label printer is mounted in a printer frame with a guide assembly that guides the movement of a hanger in order to ensure proper placement of the tag onto the neck of a hanger. As the hanger is pushed through the guide assembly, an adhesive label is wrapped around the hanger to form a flag-type tag. A fan assembly ensures that the label is held flat on left and right label plates regardless of the remaining length of the label roll. Fingers at the back of the label plates close the adhesive label onto itself to achieve the flag-type tag shape. Software communicating with the printer and the cleaner point-of-sale system automates printing of the appropriate information on each tag.

16 Claims, 3 Drawing Sheets

SEMI-AUTOMATIC GARMENT IDENTIFIER AND HANGER LABELING SYSTEM

CROSS-REFERENCE TO RELATED APPLICATIONS

This application claims the benefit of U.S. provisional patent application No. 62/534,740, entitled "Label Applicator for Garment Cleaning Industry," filed on Jul. 20, 2017. Such application is incorporated herein by reference in its entirety.

STATEMENT REGARDING FEDERALLY SPONSORED RESEARCH OR DEVELOPMENT

Not applicable.

BACKGROUND OF THE INVENTION

The commercial garment cleaning industry is labor intensive, which results in high costs for cleaners. The highly competitive nature of this industry, however, places great pressure on cleaners to reduce costs as much as possible, and one manner of doing so is to automate at least some of the steps in the cleaning process.

When garments are brought to a cleaner, an invoice is created. The invoice generally identifies the customer, the price of cleaning each garment with a total price, and lists each garment assigned to the invoice. Invoices are typically divided between laundry and dry cleaning and may only have a limited number of garments assigned to each invoice. If a customer brings in a number of garments, the customer could end up with multiple invoices. An identifier is placed on each garment tying that garment to the corresponding invoice. The garments are then separated to be cleaned and pressed, as appropriate to the garment. Once cleaned and pressed, the individual garments must be grouped back together based on the garments assigned to a particular invoice. This may result in multiple groupings depending upon the number of garments received from the customer. After the garments for a particular invoice are grouped back together, a plastic bag is placed over each group of garments to protect them, and a copy of the invoice is typically stapled to the outside of the plastic bag. The invoice stapled on the outside of the bag is used to assign the garments to a location in storage and also to return garments to a customer when the customer returns to pick up cleaned garments, or to route delivery of the garments if the garments are to be delivered.

Because manually bagging of garments is labor intensive, a cleaner may utilize a bagging machine to apply a plastic bag to a garment or group of garments. The bagging machine slides the bag over the hanger or group of hangers, with the curved upper portion of the hanger extending through a hole at the top of the bag. Although the bagging machine improves the speed of this aspect of the operation, the process is still labor intensive because a worker must identify the appropriate invoice for each group of items and either manually staple that invoice onto the appropriate bag after bagging or hang the invoice over the hanger prior to bagging.

One recent effort to address the laborious nature of this task is the highly automated garment bagging machine provided by Metalprogetti of Perugia, Italy. The Metalprogretti machine automatically bags garments and also automatically applies the appropriate invoice to the bag, thus eliminating much of the labor involved in this operation. This machine, however, is very costly, placing it financially out of reach for many cleaners. In addition, the Metalprogretti machine applies the invoice to the bag prior to bagging, which may create a problem if the bagging machine jams. When the machine is cleared and reset, the invoice that had been applied to the most recent bag will need to be reprinted so that the correct invoice is applied to each garment or group of garments in the correct order. It may be difficult for a worker to properly associate the cleaned garments with the appropriate invoice in the correct sequence, thus producing errors. The bag cannot simply be discarded and the items re-bagged because the invoice for that garment or group of garments has already been printed and applied to a bag.

A general disadvantage of applying an invoice to the face of a bag, whether this operation is performed manually or automatically, is that the invoice may be difficult to see when bags of garments are hung closely together, as they often are when awaiting pick-up or delivery. As a result, a worker may be forced to physically sort through each bagged group of garments in a particular area in order to find the correct one that corresponds with a particular customer. If the cleaner hangs the invoice over the hanger prior to bagging, then the difficulty in finding the correct bagged group of garments may be even greater, because the invoice will be positioned more toward the center of the garment rather than nearer the edge.

What is desired then is a solution for applying invoice information to a bagged group of garments that is at least partially automated in order to reduce labor costs and errors, but that does not suffer from the drawbacks associated with applying the invoice to a garment bag prior to bagging. In addition, a solution that makes the invoice information more visible after bagging would also be desirable.

References mentioned in this background section are not admitted to be prior art with respect to the present invention.

BRIEF SUMMARY OF THE INVENTION

The present invention is directed to a semi-automatic garment identifier and hanger labeling system. Rather than attaching an invoice to the bag prior to bagging, the invention utilizes a label printer with a hanger guide to facilitate quick and error-free placement of an adhesive tag onto the hanger for a particular garment or group of garments. The adhesive label is wrapped around the neck of the hanger to form a flag-type tag. By separating the bagging operation from the application of the tag, there is no possibility of confusion if the bagging machine should jam; the worker simply runs the garment or group of garments through the bagger again and continues normally. In addition, by placing the tag on the hanger instead of applying the invoice to the face of the bag, the invoice information is much more easily visible to workers for location or delivery of the cleaned garments.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Before the present invention is described in further detail, it should be understood that the invention is not limited to the particular implementations described, and that the terms used in describing the particular implementations are for the purpose of describing those particular implementations only, and are not intended to be limiting, since the scope of the present invention will be limited only by the claims.

Figure 6:
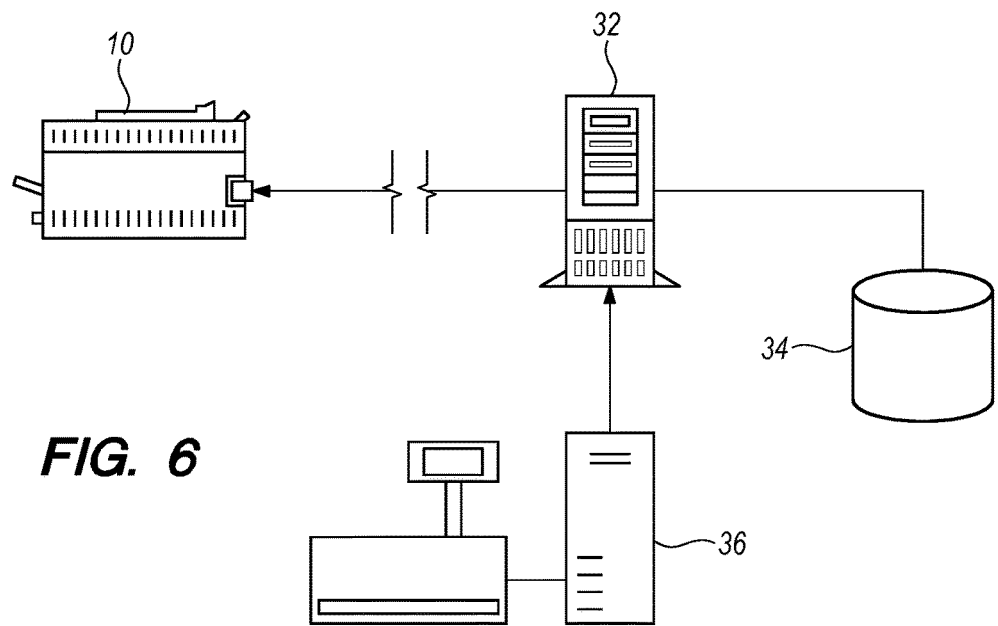
FIG. 6 is a schematic illustrating a system according to an implementation of the invention.

An implementation of the invention is comprised of three primary components, as illustrated in overview in FIG. 6. A first component is proprietary labeling software used to create a customer invoice that is printed on a tag. The software is hosted on appropriate computer hardware, such as labeling server 32. Labeling server 32 is connected, utilizing either wired or wireless network communications as necessary, with point-of-sale (POS) system 36 at a commercial cleaner. Labeling server 32 may be located locally or remotely with respect to POS system 36. Labeling database 34 is implemented as either local data storage for labeling server 32 or as a remote, physically separate storage component with respect to labeling server 32. The labeling software hosted at labeling server 32 includes an interface that allows different POS systems 36 using different invoice formats to pass all necessary invoice information to labeling server 32, which then stores the invoice information at label database 34. When an order is completed, the software hosted at labeling server 32 automatically generates an image of a tag with the necessary invoice information. This image typically includes some or all of the invoice number, a bar code of the invoice number, the store or route designation, the customer name, due date and time, and the number of garments (pieces) on the invoice. The software is configurable to display other information on the printed label, as may be requested by the cleaner and provided by POS system 36.

The second primary component of the system is printer 10. Printer 10 may be implemented as any label printer that will operate correctly when turned in the appropriate orientation for vertical application of a label (tag) to a hanger. With respect to most applications, this means that the printer is turned on its side. One example of an appropriate printer that will operate reliably in this orientation as printer 10 is the SQUIX thermal transfer printer from cab Produkttechnik GmbH & Co KG of Karlsruhe, Germany. This printer can print 1.5"×6" adhesive labels and includes an automatic label peeler. By communicating with printer 10, the software hosted at labeling server 32 may cause a label to be printed to form a flag-type hanger tag. Printer 10 may be physically situated locally or remotely with respect to labeling server 32, and may communicate with labeling server 32 by any wired or wireless communications network.

Figure 1:
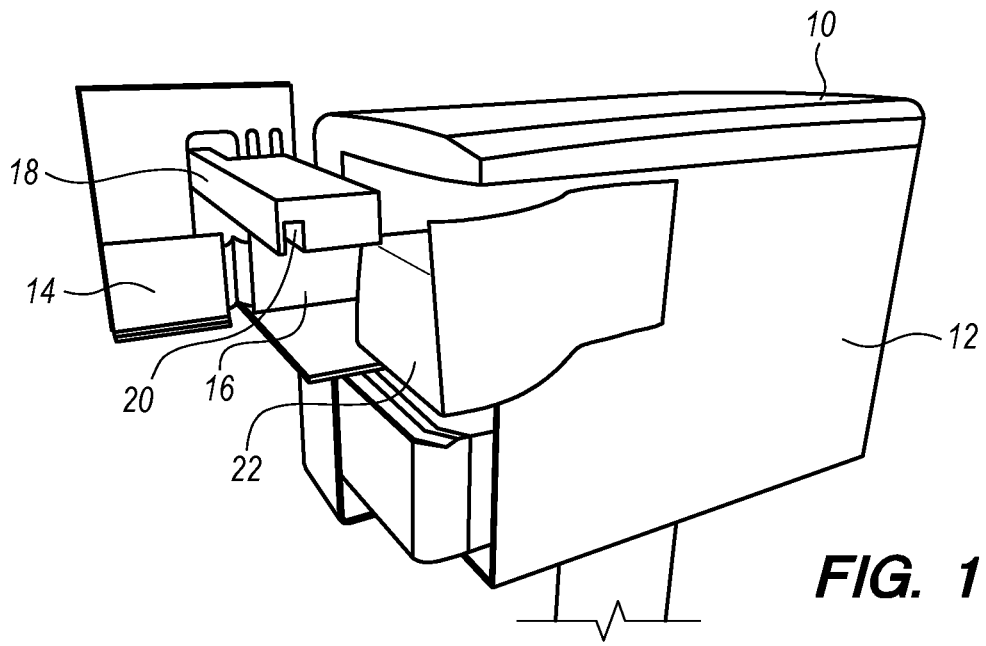
FIG. 1 is a front perspective view of the printing assembly of an implementation of the invention.
Figure 2:
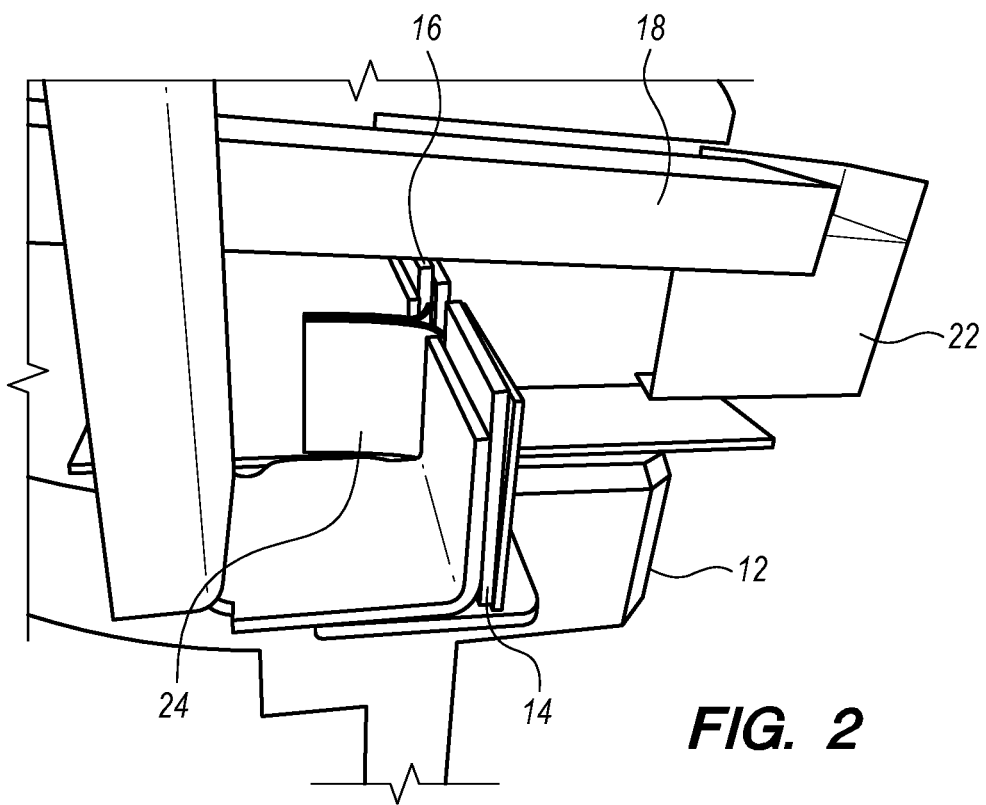
FIG. 2 is a rear perspective view of the printing assembly of an implementation of the invention.

The third component of the system is a printer stand and hanger guide assembly, as illustrated along with printer 10 in FIGS. 1 and 2. A printer frame 12 is used to secure printer 10 in the appropriate position and orientation for application of a tag. In one implementation, printer frame 12 is designed to receiver printer 10 in a sideward orientation, such that printer 10 feeds labels in a vertical orientation. Printer frame 12 may further be of appropriate height such that printer 10 is positioned at a comfortable height for a worker to place tags onto hangers. Printer frame 12 provides mounting points for left label plate 14 and right label plate 16. These plates are mounted at the label output of printer 10, and positioned with respect to each other such that a vertical gap remains between them through which a hanger may pass during the tagging operation. Above the gap between left label plate 14 and right label plate 16 is hanger guide block 18. Hanger guide block 18 includes hanger guide slot 20, which is aligned with the gap between left label plate 14 and right label plate 16. Hanger guide slot 20 is sized to receive the top curved portion of a garment hanger. Hanger guide block 18 extends forwardly from left label plate 14 and right label plate 16, such that a hanger may be positioned in hanger guide slot 20 in advance of drawing the hanger through the gap between left label plate 14 and right label plate 16. Hanger guide block 18 may be constructed of a material that provides a low coefficient of friction, including a synthetic fluoropolymer such as polytetrafluoroethylene (PTFE). Alternatively, hanger guide slot 20 may be coated in a material such as PTFE, or any other lubricant.

Fan assembly 22 may be positioned forwardly from left label plate 14 and right label plate 16, as shown most clearly in FIG. 1. Fan assembly 22 may include a small fan (not shown), such as any of a number of small electric fans commonly used in electronic equipment such as computers. Fan assembly 22 is oriented such that it blows air in the direction of a label that is positioned across left label plate 14 and right label plate 16. The purpose of fan assembly 22 is to ensure that as a label is extended across left label plate 14 and right label plate 16, the label will remain appropriately flat as it receives the neck of a hanger. The inventor hereof has found that in the absence of fan assembly 22 a label may have a tendency to curl, this tendency being dependent at least partially on the number of the remaining labels on the label roll being fed from printer 10. In alternative implementations of the invention, fan assembly 22 may be replaced with a nozzle attached to a compressed air source.

At the rearward side of left label plate 14 and right label plate 16 are fingers 24, as most clearly shown in FIG. 2. Fingers 24 may be formed of any appropriately resilient material, such as rubber. Fingers 24 extend rearwardly from the gap between left label plate 14 and right label 16 and touch together rearward of this gap. The purpose of fingers 24 is to draw the two sticky side of a label together as the hanger is drawn past, thereby forming a flag-type tag on the hanger from an adhesive label.

Figure 3:
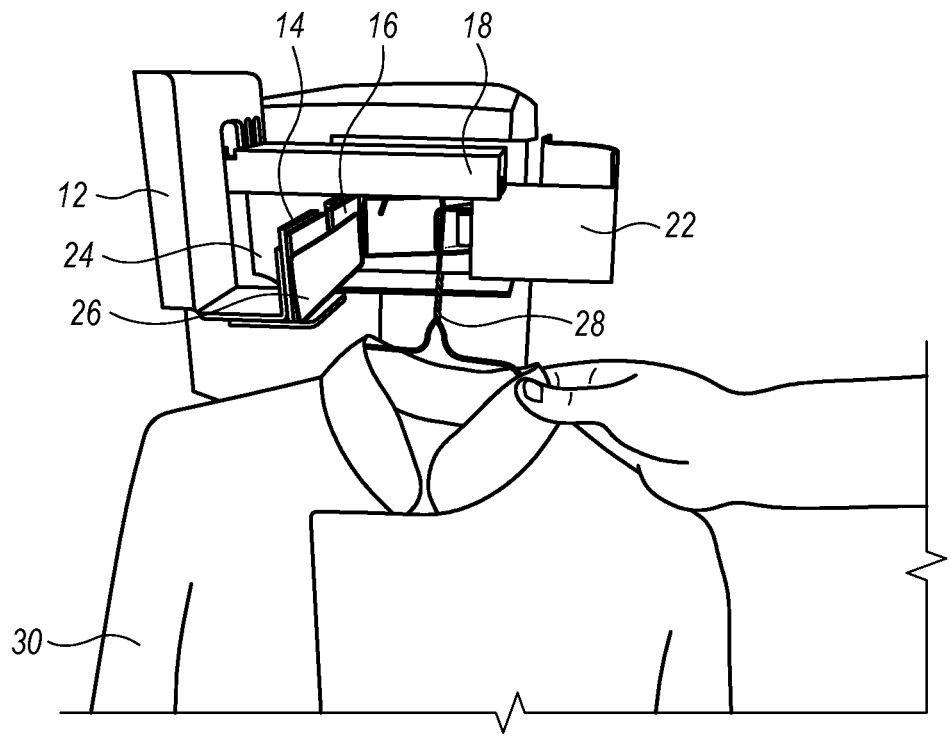
FIG. 3 is a perspective view of the printing assembly of an implementation of the invention with a garment at a first stage of operation.

The various parts of printer frame 12 and the attached hanger guide assembly having now been described, the operation of the apparatus may now be described with reference to FIGS. 3-5. FIG. 3 illustrates a garment 30 on a hanger 28, with hanger 28 positioned forward of a label 26 after it has been fed by printer 10 onto left label plate 14 and right label plate 16. Feeding of the label occurs automatically, under the direction of the software executing at labeling server 32. This position of a garment 30 and hanger 28, as illustrated in FIG. 3, may be referred to as a first position during the operation of applying a tag. Hanger 28 is being held at the appropriate orientation to begin the process of applying a tag. The curved upper portion of hanger 28 is positioned within hanger guide slot 20 of hanger guide block 18, which ensures that hanger 28 is correctly oriented both vertically and horizontally for proper placement of the tag. The fan of fan assembly 22 provides an air current that pushes label 26 firmly against left label plate 14 and right label plate 16. Printer 10 is oriented such that it feeds label 26 into position with the sticky side of label 26 facing toward hanger 28.

Figure 4:
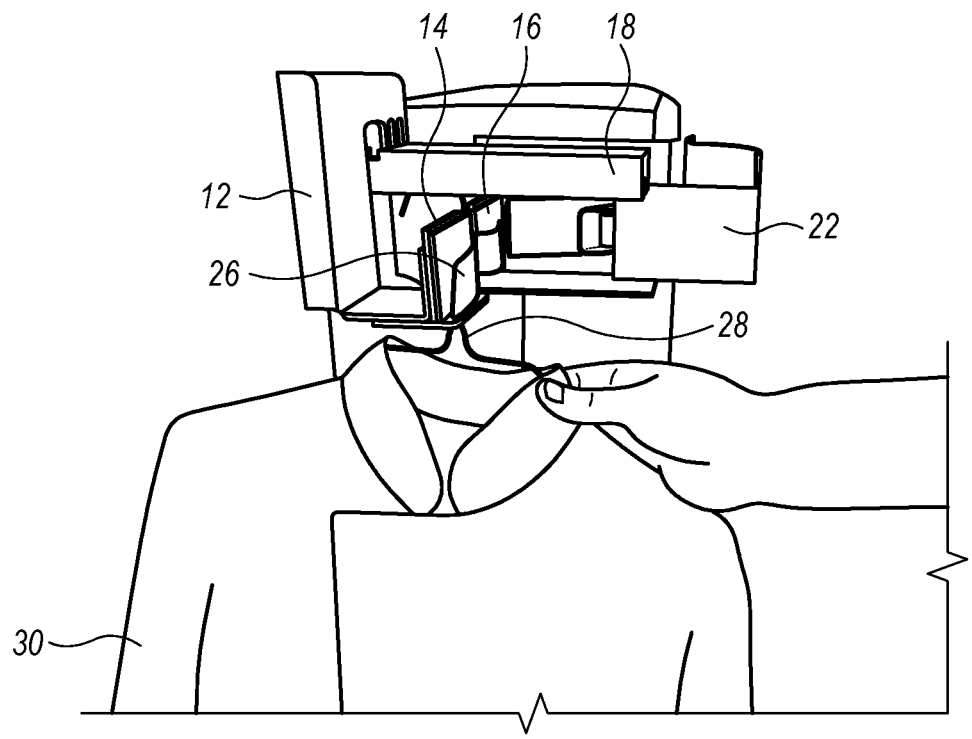
FIG. 4 is a perspective view of the printing assembly of an implementation of the invention with a garment at a second stage of operation.
Figure 5:
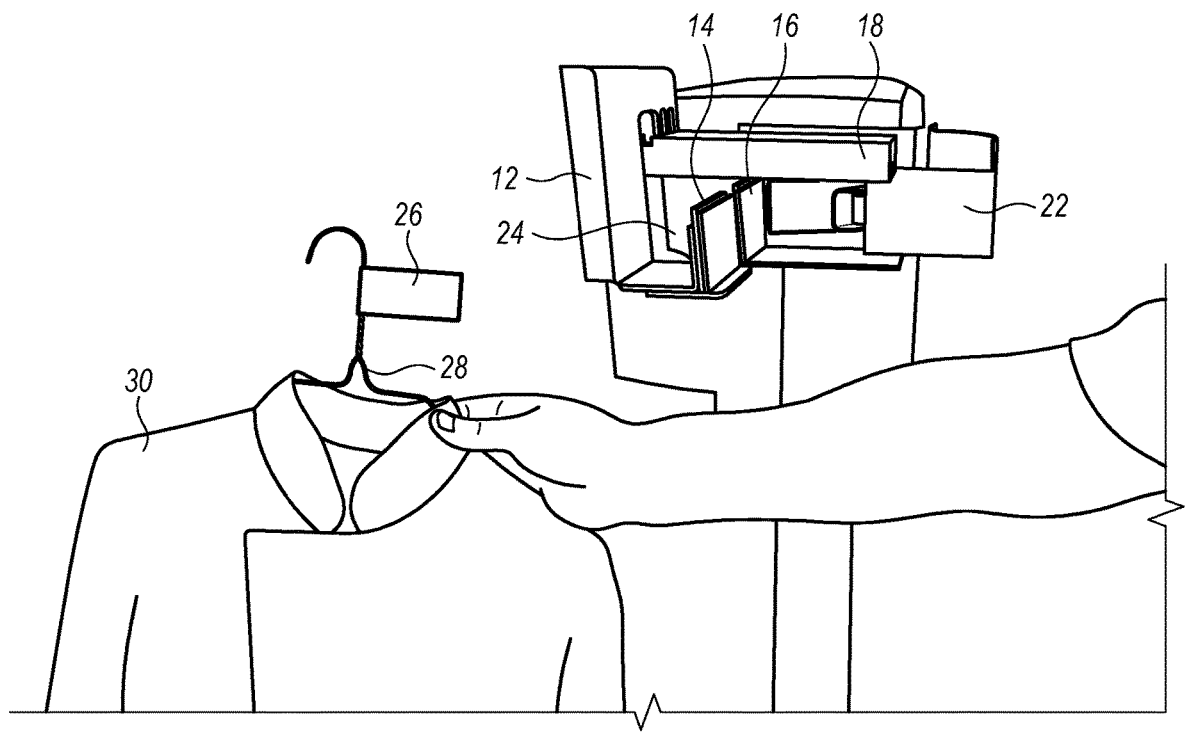
FIG. 5 is a perspective view of the printing assembly of an implementation of the invention with a garment at a third stage of operation.

FIG. 4 illustrates a second position during the operation of applying a tag. At this position, the neck of hanger 28 has just been passed through the gap between left label plate 14 and right label plate 16. Hanger guide slot 20 of hanger guide block 18 continues to ensure that hanger 28 is positioned at the correct vertical and horizontal orientation as it moves rearward with respect to printer frame 12. As hanger 28 contacts label 26, label 26 begins to be pulled by hanger 28 into the gap between left label plate 14 and right label plate 16. As the movement continues, the sticky face of label 26 to either side of hanger 28 is wrapped against itself by fingers 24. Once hanger 28 is drawn far enough rearwardly in this operation, it may be seen that label 26 will be fully wrapped in half with sticky faces against each other, thereby forming a flag-shaped tag with invoice information related to garment 30. This third position, once the tagging operation is complete, is illustrated in FIG. 5.

It may be seen from the above description that a simple rearward and then downward movement is all that is necessary in order for a worker to apply a tag in the correct orientation. This operation is far quicker and much less likely to result in errors that the process of printing and manually stapling an invoice to each bagged garment or group of garments. In addition, it may be seen that due to the manner by which the label is applied to the hanger to form a flag-type tag, the result is a tag that may be printed on both sides. The presence of printing on both sides may greatly aid in identification of a garment or bagged group of garments, because the relevant information may be seen by a worker regardless of which side is presented to the worker when the worker is searching for the garment or group of garments.

Although the operation has been illustrated with respect to a single garment 30, it may be understood that multiple garments on different hangers may be bagged together with the garment that was tagged. In various implementations, the invention may be utilized in connection with a manual bagging system or an automatic bagger. If the tag is applied prior to bagging then multiple garments may be grouped with the tagged garment prior to bagging. In alternative embodiments of the invention, however, tagging could be performed after bagging, whether performed manually or automatically.

When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. An apparatus for applying a tag to a garment hanger comprising a lower garment hanging portion and an upper hook portion, the apparatus comprising:
   a. a label printer comprising a label output;
   b. a label plate positioned at the label output of the label printer to receive a label from the label printer, wherein the label plate comprises a left label plate and a right label plate, wherein the left label plate and right label plate are positioned with respect to each other so as to form a vertical gap between the left label plate and the right label plate, and further comprising an open area beneath the label plate sized to receive both the garment hanger and a garment hanging on the garment hanger;
   c. a hanger guide positioned above and extending forwardly from the label plate, wherein the hanger guide comprises a hanger guide slot aligned with the vertical gap between the left label plate and the right label plate and sized to receive the upper hook portion of the hanger whereby the garment hanger with the garment hanging on the hangar, when manually inserted into the apparatus, is guided toward the vertical gap between the left label plate and the right label plate; and
   d. a plurality of resilient fingers extending rearwardly from the label plate, wherein the fingers close together behind the label plate with the fingers in contact with the tag to seal the tag to itself around the upper hook portion of the garment hangar.

2. The apparatus of claim 1, wherein the hanger guide slot comprises a low-friction material.

3. The apparatus of claim 2, wherein the hanger guide slot comprises polytetrafluoroethylene.

4. The apparatus of claim 1, further comprising a printer frame to which the printer, the left label plate, and right label plate, and the hanger guide block are mounted.

5. The apparatus of claim 1, further comprising a fan assembly comprising a fan aligned to blow air onto a label on the label plate in order to hold the label flat on the label plate.

6. The apparatus of claim 5, further comprising a labeling server in communication with the printer, wherein the labeling server houses labeling software configured to receive invoice information and to generate commands to the printer to print a second label with at least a portion of the invoice information in response to a signal that the label has been applied to the garment hanger.

7. The apparatus of claim 6, further comprising a label database in communication with the labeling server wherein the label database is configured to store invoice information.

8. The apparatus of claim 7, further comprising a point-of-sale (POS) system in communication with the labeling server, wherein the POS system is configured to output invoice information to the labeling software at the labeling server.

9. A printer assembly for mounting to a printer, comprising:
   a. a first label plate positioned at an output of the printer;
   b. a second label plate positioned adjacent to and co-planar with the first label plate such that a gap exists between the first label plate and the second label plate and an open area is formed beneath the first and second label plate sized to receive both a garment hanger and a garment hanging on the garment hanger;
   c. a hanger guide positioned above the gap between the first label plate and the second label plate, wherein the hanger guide comprises a hanger guide slot sized to receive an upper curved end of the garment hangar and co-planar with the gap between the first label plate and the second label plate; and d. first and second fingers extending rearwardly from the label plate, wherein the first and second fingers comprise a resilient material, each of the first and second fingers comprise proximate and distal ends, the first finger proximate end is attached to the first label plate adjacent to the gap between the first label plate and the second label plate, the second finger proximal end is attached to the second label plate adjacent to the gap between the first label plate and the second label plate, and the first and second fingers meet behind the gap between the first label plate and the second label plate at the first and second finger distal ends and further wherein the first and second fingers are sufficiently resilient to allow a tag to pass between the first and second fingers but nevertheless seal the tag around the upper curved end of the garment hanger.

10. The printer assembly of claim 9, wherein the hanger guide comprises a material comprising a low coefficient of friction.

11. A method of creating and attaching a flag-type tag to a hanger, the method comprising the steps of:
- a. printing a label at a label printer, wherein the label comprises invoice information;
- b. outputting the label from the label printer onto a label plate;
- c. receiving a manually inserted hanger upper curved end on a hanger to which a garment is attached at a hanger guide, wherein the hanger guide directs the hanger toward a gap in the label plate; and
- d. utilizing resilient fingers behind the label plate to draw a sticky side of the label together around the hanger to form a flag-type tag on the hanger as the hanger passes through the hanger guide and through the gap in the label plate.

12. The method of claim 11, further comprising the step of directing air from a fan assembly toward the label on the label plate in order to hold the label flat on the label plate.

13. The method of claim 12, further comprising the step of, after forming a flag-type tag hanger, fitting a bag over a garment on the hanger.

14. The method of claim 12, further comprising the step of sending a label image to the label printer from a labeling server.

15. The method of claim 14, further comprising the step of sending invoice information from a point-of-sale (POS) system to the labeling server.

16. The method of claim 15, further comprising the step of, after receiving invoice information from the POS system at the labeling server, storing the invoice information in a label database.

* * * * *